Patented June 2, 1936

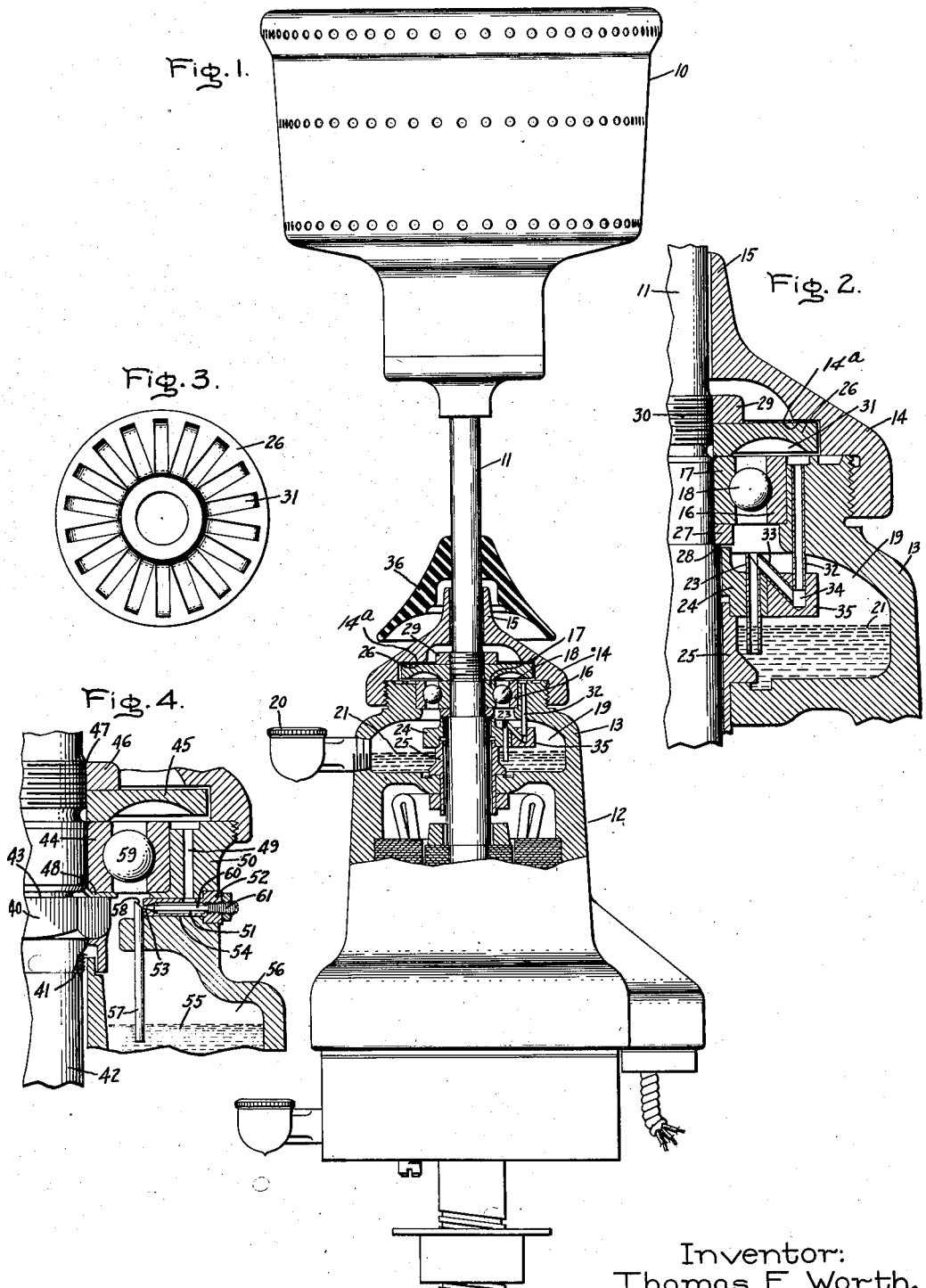

2,042,575

UNITED STATES PATENT OFFICE 2,042,575

LUBRICATING SYSTEM

Thomas F. Worth, Lynn, Mass., assignor to General Electric Company, a corporation of New York Application February 19, 1935, Serial No. 7,199

19 Claims. (Cl. 308—187)

My invention relates to lubricating systems for shaft bearings.

In many present day machines and particularly in those designed for various textile manufacturing operations such as rayon spinning, it is necessary to provide shafts driven at speeds of from 5000 to 20,000 R. P. M. Bearings must be provided for such rotatable shafts, these bearings usually being of the anti-friction type. The lubricating system for a bearing associated with a shaft rotating at such extremely high speed must be designed with the greatest care since an adequate supply of lubricant is vital not only to protect the engaging surfaces of the bearing and shaft but also to maintain the necessary power consumption as low as possible. The lubricating system for a bearing in such service should provide an ample reserve of lubricant and provision should be made for constantly supplying fresh lubricant to the bearings at a definite rate without leakage therefrom. Either a deficiency or surplus of lubricant will cause large and even dangerous friction losses in bearings operating at such high speeds. If the supply is deficient the contacting surfaces will become dry and will be in direct contact, thus damaging the bearing, on the other hand a surplus of lubricant will cause excessive friction losses and may even cause the bearings to burn out. The leakage of lubricant, due to its contact with parts of the apparatus which rotate at high speed is increased in the case of rayon spinning apparatus, or the like, in which an acid deflector shield, or some similar member is carried on the rotating shaft just above the bearing, because this member acts as a fan and tends to suck a spray of lubricant from the bearing, thus causing an excessive loss of lubricant from the bearing.

It is an object of my invention to provide a lubricating system for a rotatable shaft and its bearings which will insure an adequate supply of lubricant at a sufficiently limited rate to prevent excessive friction in the bearings even at very high speed.

It is a further object of my invention to provide a lubricating system for a rotatable shaft and its bearings in which provision is made to prevent the loss of lubricant therefrom due to the fan action of rotating surfaces closely adjacent thereto.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which Fig. 1 is a front elevation partly in section of a rayon spinning motor having a shaft and bearing therefor provided with a lubricating system embodying my invention; Fig. 2 is a detailed sectional view of a portion of the shaft, bearing, and lubricating system shown in Fig. 1; Fig. 3 is a view of the bottom of the impeller shown in the lubricating system of Fig. 1; and Fig. 4 is a detailed sectional view of a modified form of shaft, bearing, and lubricating system for the machine shown in Fig. 1.

Referring to the drawing, I have shown in Fig. 1 a rayon spinning bucket 10 mounted on a vertical rotatable shaft 11 of an electric motor 12. The electric motor 12 is enclosed in a main housing 13 which includes a cap 14 which is screwed to the top of the main housing 13 and has an upwardly extended portion 15 closely surrounding the shaft 11. The shaft 11 is supported by a lower bearing and an upper anti-friction ball bearing of the same construction, which includes an outer race 16 secured in a bore in the interior of housing 13 and an inner race 17 secured to the shaft 11. Balls 18 are carried between the inner race 17 and the outer race 16. A lubricant reservoir 19 is formed in the housing 13 below the ball bearing and surrounding the shaft. The reservoir 19 may be filled with oil or other lubricant through a cup 20 which is secured in the side of the housing, the lubricant normally filling the reservoir 13 to a level indicated at 21.

I lubricate the ball bearing 18 by supplying atomized lubricant thereto from the reservoir 19. The lubricant supplied from the reservoir 19 is atomized in the upper end of a passage or conduit 23 secured to a collar 24 mounted on the upper end of the sleeve 25 surrounding the shaft 11 which forms the inner wall of the oil reservoir about the shaft. The conduit 23 extends below the level 21 of the lubricant in the reservoir 19 and its upper or discharge end is directed toward the balls 18 of the bearing. The lubricant is induced to flow upwardly through the conduit 23 and is atomized at the upper end thereof by supplying a blast of air, which during operation of the bearing contains oil vapor, adjacent the discharge end of the conduit 23. I accomplish this by securing an impeller 26 and the inner race 17 of the ball bearing to the shaft 11 between a collar 27 engaging the shoulder 28 on the shaft and the nut 29 threaded on the shaft 11 at 30.

The impeller 26 is provided with a plurality of radially extending arcuate grooves 31 on the active lower surface thereof, which extend from above the inner race 17 outwardly beyond the periphery of the outer race 16 of the bearing. During operation of the motor the impeller 26 draws air, or air laden with oil vapor, discharged from the upper end of the conduit 23 upwardly through the bearing and discharges the same through connected passages or conduits 32 and 33 into the upper end of the conduit 23, the connected conduits 32 and 33 and conduit 23 forming the two branches of a branched conduit having its common or discharge end adjacent the bearings. The air discharged from the common end of the branched conduit induces a flow of lubricant from the reservoir 19 upwardly through the conduit 23 and atomizes the same at the upper end thereof, so that the atomized spray thus formed will again flow upwardly through the bearing and be returned again to the conduits 32 and 33. It will be noted that conduits 32 and 33 are connected by a recess 34 in the supporting member 35, the latter being carried on the collar 24. The moving surfaces of the ball bearing are thus covered with a finely divided spray of lubricant and very effectively lubricated thereby, since a fresh supply is being constantly and positively deposited thereon in the form of a spray. The reservoir 19 insures an adequate reserve supply of lubricant for the bearing which may be readily checked and replenished by observing the level of lubricant in the cup 20. As the motor comes up to speed at starting the air pressure produced in the atomizing tube 23 by the impeller 26 increases proportionately and hence the amount of lubricant sprayed on the bearing also increases. Since the lubricant is positively carried to the bearing, however, the impeller 26 may be so proportioned that an excess of lubricant will not be carried to the bearing. After coming up to speed the motor operates at a practically constant speed and the lubricant is also supplied at a constant rate since the rate of supply of lubricant is a function of speed of the impeller 26. When oil is used as the lubricant in the reservoir and is heated to about 48° C., as it is frequently by heat generated by the moving parts, it gives off an oil vapor which passes upwardly to the bearing located thereabove and aids materially in its lubrication. This further illustrates the desirability of locating the reservoir below the bearing.

An acid deflector shield 36 is carried on the shaft 11 just above the cap 14 of housing 13 to protect the housing and its contents from acid in the rayon bucket 10. The upwardly extending portion 15 of cap 14 closely surrounds the shaft 11 and normally forms a seal therewith which would tend to prevent the leakage of lubricant from above the bearing. It will be noted, however, that the acid deflector shield 36 has a lower surface of substantial area closely adjacent the upper portion 15 of the housing cap 14 and when the shaft 11 and acid deflector shield 36 are rotated at high speed this lower surface of the shield acts as a fan tending to suck air and lubricant through the seal formed between portion 15 of the cap 14 and the shaft 11, that is, the pressure within the bearing housing is lowered to a value below atmospheric pressure. In accordance with this aspect of my invention, however, the upper surface of the impeller 26, which is an active surface, is proportioned with respect to the effective area of the lower surface of the acid deflector shield 36 so as to neutralize the negative or lowered pressure which would otherwise be created by the shield 36 in the upper portion of the housing 14. The interior surface of the housing cap 14 is provided with a circular groove therein having a flat horizontal complementary surface 14a located closely adjacent a substantial portion of the upper surface of the impeller 26 adjacent the periphery thereof. The upper surface of impeller 26 throws air outwardly thus tending to draw air through the seal formed by extension 15, and setting up a comparatively high pressure between the upper surface of the impeller 26 and the complementary surface 14a of the bearing housing 14 which minimizes the leakage of lubricant therethrough. This tendency of the impeller 26 to draw air through the seal formed by the extension 15 balances the opposite or negative pressure therein caused by the acid deflector shield 36. It is necessary to neutralize the negative pressure created by the shield 36, not only in order to prevent the leakage and hence loss of lubricant, but also to prevent a large amount of lubricant being drawn into the upper portion of housing 13 from reservoir 19. If the latter was allowed to happen a false indication of the amount of lubricant in the system would be given at the cup 20 for when the machine was running it would appear that the system lacked lubricant and if more were added at that time it would overflow from the cup 20 when the machine was stopped due to the settling of the lubricant drawn into the upper part of the housing. By using impeller 26 to neutralize the negative pressure in the upper portion of the housing this possibility of false level indication is avoided.

In Fig. 4, I have shown a modified arrangement for mounting the inner bearing race on the motor shaft, as well as for supplying lubricant thereto. In this modified arrangement, a nut 40 is screwed on the threaded portion 41 of the motor shaft 42. The shaft 42 corresponds to the shaft 11 shown in Fig. 1. The upper side 43 of the nut 40 forms a shoulder against which the inner bearing race 44 is clamped by an impeller 45, which is in turn held in place by a lock nut 46 threaded to the shaft 42 at 47. A lock washer 48 is placed between the inner race 44 and the shoulder 43. Air or air containing atomized lubricant is forced downwardly through a passage 49 formed in the housing 50, by the impeller 45 located thereabove, enters a valve chamber 51 formed in a valve body 52, and is discharged through the valve opening 53. The valve body 52 is mounted in a bore 54 formed in the housing 50. This discharged air sucks lubricant 55 from the reservoir 56, formed in the housing 50, through the conduit 57 which extends into the oil, and atomizes the same. The upstanding portion 58 of the conduit 57 extends over the end of valve body 52 so as to deflect the atomized lubricant causing it to move upwardly through the ball bearing 59. The atomized lubricant is then recirculated through the passage 49 by the impeller 45, as described in connection with the apparatus, shown in Fig. 1. The valve body 52 contains a needle valve element 60 which is threaded in the valve body 52 as indicated at 61. The opposite portion of the valve element 60 is tapered at the end and seats in the opening 53. The valve element may be moved toward or away from its seat by screwing it in or out of the threads 61, the end of the valve element being slotted to receive the screw driver or the like. By this arrangement, the amount of air supplied to the end of the conduit 57, and hence the amount of lubricant drawn therethrough from the reservoir 56 and supplied to the bearing 59, may be conveniently regulated. Such regulation may be particularly desirable in case the speed of the motor 12 is varied or in case a lubricant of different viscosity is used.

While I have shown a particular embodiment of my invention in connection with a rayon spinning motor, I do not desire my invention to be limited to the particular construction shown and described, and I intend in the appended claims to cover all modifications within the spirit and scope of my invention.

What I claim as new and desire to secure by Letters Patent of the United States is:

1. A lubricating system for a rotatable shaft and a bearing therefor, comprising a lubricant reservoir adjacent said bearing, means including an impeller carried by said shaft for atomizing lubricant from said reservoir and for circulating the same through said bearing, said atomizing means including a passage having an inlet below the lubricant level in said reservoir and a discharge outlet in proximity to said bearing and a second passage communicating with the outlet side of said impeller and discharging at the outlet end of said first mentioned conduit.

2. A lubricating system for a rotatable shaft and a bearing therefor, comprising a lubricant reservoir adjacent said bearing, and means including an impeller carried by said shaft for atomizing lubricant from said reservoir and circulating the same through said bearing, said means including a branched passage having one branch communicating with the outlet of said impeller and a second branch communicating with said reservoir and a common end of said passage extending in proximity to said bearing.

3. A lubricating system for a rotatable shaft and a bearing therefor, comprising a lubricant reservoir adjacent said bearing, and means including an impeller carried by said shaft with its inlet side adjacent said bearing for atomizing lubricant from said reservoir and recirculating the same through said bearing, said atomizing means including a passage communicating with the outlet side of said impeller and a second passage communicating with said reservoir, said passages having adjacent outlets in proximity to said bearing.

4. A lubricating system for a rotatable shaft and an anti-friction bearing therefor having an inner race secured to said shaft, comprising a housing surrounding said bearing and forming a lubricant reservoir therefor, and means including an impeller and a branched passage for atomizing lubricant from said reservoir and recirculating the same through said bearing, said impeller having its inlet side adjacent said bearing and being secured to said shaft and bearing against said inner race, one branch of said passage communicating with the outlet side of said impeller and a second branch thereof communicating with said reservoir, the common end of said branched passage extending in proximity to said bearing.

5. A lubricating system for a rotatable shaft and a bearing therefor, comprising a housing surrounding said bearing having a portion extending beyond said bearing through which said shaft extends, a lubricant reservoir on the opposite side of said bearing from said extended portion of said housing, and means including an impeller and a branched conduit for atomizing lubricant from said reservoir and recirculating the same through said bearing, said impeller being carried by said shaft in said extended portion of said housing with its inlet side adjacent said bearing, a support within said housing carrying said branched conduit, said branched conduit having a V-shaped branch communicating with the outlet side of said impeller and a vertical branch communicating with said reservoir, the common end of said conduit extending in proximity to said bearing.

6. A lubricating system for a vertical rotatable shaft and a bearing therefor, comprising a lubricant reservoir surrounding said shaft below said bearing, and means including an impeller and two conduits for atomizing lubricant from said reservoir and circulating the same through said bearing, said impeller being carried by said shaft above said bearing, one of said conduits having its inlet end below the lubricant level in said reservoir and its discharge end in proximity to the lower side of said bearing, the other of said conduits communicating with the outlet side of said impeller and with said discharge end of said first mentioned conduit.

7. A lubricating system for a vertical rotatable shaft and a bearing therefor comprising a lubricant reservoir surrounding said shaft below said bearing, and means including an impeller and two conduits for atomizing lubricant from said reservoir and recirculating the same through said bearing, said impeller being carried by said shaft above said bearing with its inlet side adjacent said bearing, one of said conduits having its inlet end below the lubricant level in said reservoir and its discharge end in proximity to the lower side of said bearing, the other of said conduits communicating with the outlet side of said impeller and with said discharge end of said first mentioned conduit.

8. A lubricating system for a vertical rotatable shaft and an anti-friction bearing therefor having an inner race secured to said shaft, comprising a housing surrounding said bearing and forming a lubricant reservoir therefor below the same, and means including a branched conduit and an impeller for atomozing lubricant from said reservoir and recirculating the same through said bearing, said impeller having its inlet side adjacent said bearing and being secured to said shaft and bearing against said inner race, said branched conduit having one branch communicating with the outlet side of said impeller and a second branch communicating with said reservoir, the common end of said branched conduit extending in proximity to the lower side of said bearing.

9. A lubricating system for a rotatable shaft and a bearing therefor, comprising a lubricant reservoir on one side of said bearing, a member carried by said shaft on the other side of said bearing having a lower surface of substantial area in proximity to said bearing thereby sucking lubricant vapor from said bearing upon rotation of said member, and means located between said member and said bearing for neutralizing the suction of said member and for atomizing lubricant from said reservoir and circulating the same through said bearing.

10. A lubricating system for a rotatable shaft and a bearing therefor, comprising a lubricant reservoir on one side of said bearing, a member carried by said shaft on the other side of said bearing having a lower surface of substantial area in proximity to said bearing thereby sucking lubricant vapor from said bearing upon rotation of said member, and means including an impeller located between said member and said bearing for neutralizing the suction of said member and for atomizing lubricant from said reservoir and circulating the same through said bearing, said impeller being carried by said shaft between said member and said bearing and having an active surface adjacent said member for creating a pressure to neutralize the suction caused by said member and an active surface adjacent the bearing for circulating lubricant through said bearing from said reservoir.

11. A lubricating system for a rotatable shaft and a bearing therefor, comprising a lubricant reservoir on one side of said bearing, a member carried by said shaft on the other side of said bearing having a lower surface of substantial area in proximity to said bearing thereby sucking lubricant vapor from said bearing upon rotation of said member, and means including an impeller and a branched conduit for neutralizing the suction of said member and for atomizing lubricant from said reservoir and recirculating the same through said bearing, said impeller being carried by said shaft between said member and said bearing and having an active surface adjacent said member for creating a pressure to neutralize the suction caused by said member, said impeller having another active surface with its inlet side adjacent the bearing for circulating lubricant therethrough, said branched conduit having one branch communicating with the outlet side of said impeller and a second branch communicating with said reservoir, the common end of said conduit extending in proximity to said bearing.

12. A lubricating system for a vertical rotatable shaft and a bearing therefor, comprising a lubricant reservoir surrounding said shaft below said bearing, a member carried by said shaft above said bearing having a lower surface of substantial area in proximity to said bearing thereby sucking lubricant vapor from said bearing upon rotation of said member and means including an impeller for neutralizing the suction of said member and for atomizing lubricant from said reservoir and circulating the same through said bearing, said impeller being carried by said shaft above said bearing and below said member and having an active surface adjacent said member for creating a pressure to neutralize the suction caused by said member and an active surface adjacent the bearing for circulating lubricant through said bearing from said reservoir.

13. A lubricating system for a vertical rotatable shaft and a bearing therefor, comprising a lubricant reservoir surrounding said shaft below said bearing, a member carried by said shaft above said bearing having a lower surface of substantial area in proximity to said bearing thereby sucking lubricant vapor from said bearing upon rotation of said member, and means including an impeller and conduits for neutralizing the suction of said member and for atomizing lubricant from said reservoir and circulating the same through said bearing, said impeller being carried by said shaft above said bearing and below said member and having an active surface adjacent said member for creating a pressure to neutralize the suction caused by said member and an active surface adjacent the bearing for circulating lubricant through said bearing from said reservoir, one of said conduits having its inlet end below the lubricant level in said reservoir and its discharge end in proximity to the lower side of said bearing and the other of said conduits communicating with the outlet side of said impeller and with said discharge end of said first mentioned conduit.

14. A lubricating system for a vertical rotatable shaft and a bearing therefor, comprising a lubricant reservoir surrounding said shaft below said bearing, a member carried by said shaft above said bearing having a lower surface of substantial area in proximity to said bearing thereby sucking lubricant vapor from said bearing upon rotation of said member, and means including an impeller and a branched conduit for neutralizing the suction of said member and for atomizing lubricant from said reservoir and circulating the same through said bearing, said impeller being carried by said shaft above said bearing and below said member and having an active surface adjacent said member for creating a pressure to neutralize the suction caused by said member and an active surface adjacent the bearing for circulating lubricant through said bearing from said reservoir, said branched conduit having one branch communicating with the outlet side of said impeller and another branch communicating with said reservoir, the common end of said branched conduit extending in proximity to the lower side of said bearing.

15. A spinning spindle for a rayon bucket or the like comprising a rotatable vertical shaft and a bearing therefor the upper end of said shaft being adapted to support a rayon spinning bucket or the like, a housing surrounding said bearing and having an upwardly extending portion closely surrounding said shaft, an acid deflector shield carried by said shaft intermediate said bucket and said housing having a lower surface of substantial area in proximity to the upwardly extending portion of said housing thereby sucking lubricant from said housing upon rotation of said deflector shield, a lubricant reservoir in said housing below said bearing, and combined means including an impeller for neutralizing the pressure in said extended portion of said housing and for circulating lubricant from said reservoir, said impeller being carried by said shaft in said extended portion of said housing and having a flat upper surface for creating a pressure approximately equal and opposite to that created by said deflector shield in said housing and having a radially grooved lower surface for sucking lubricant from the top of said bearing and discharging the same into a return passage to the lower side of said bearing.

16. A lubricating system for a vertical rotatable shaft and a bearing therefor, including a housing surrounding said bearing having a portion extending upwardly therefrom through which said shaft extends, a lubricant reservoir in said housing below said bearing, means for forcing lubricant upwardly from said reservoir to said bearing, a member carried by said shaft above said bearing having a lower surface of substantial area adjacent said extended portion of said housing thereby lowering the pressure therein below atmospheric pressure upon rotation of said member, and means including an impeller carried by said shaft in said extended portion of said housing above said bearing for neutralizing the lowered pressure created in said extended portion of said housing to prevent the leakage of lubricant therefrom, said housing being provided with an interiorly located annular groove forming a complementary surface located closely adjacent a substantial portion of the upper surface of said impeller adjacent the periphery thereof.

17. A spinning spindle for a rayon spinning bucket or the like comprising a rotatable vertical shaft and a bearing therefor the upper end of said shaft being adapted to support a rayon spinning bucket or the like, a housing surrounding said bearing and having an extended portion closely surrounding said shaft, an acid deflector shield carried by said shaft intermediate said bucket and said housing having a lower surface of substantial area in proximity to the upwardly extending portion of said housing thereby lowering the pressure in said upwardly extending portion of said housing below atmospheric pressure upon rotation of said deflector shield, and means including an impeller carried by said shaft in said extended portion of said housing between said seal and said bearing for neutralizing the lowered pressure created in said extended portion of said housing to prevent the leakage of lubricant therefrom.

18. A lubricating system for a rotatable shaft and a bearing therefor, comprising a lubricant reservoir adjacent said bearing, means including an impeller carried by said shaft for atomizing lubricant from said reservoir and for circulating the same through said bearing, said atomizing means including a passage having an inlet below the lubricant level in said reservoir and a discharge outlet in proximity to said bearing and a second passage communicating with the outlet side of said impeller and discharging at the outlet end of said first mentioned conduit, and means for regulating the amount of air supplied from said impeller to said first mentioned passage.

19. A lubricating system for a rotatable shaft and an antifriction bearing therefor having an inner race secured to said shaft, comprising a housing surrounding said bearing and forming a lubricant reservoir therefor, means including an impeller and a branched passage for atomizing lubricant from said reservoir and recirculating the same through said bearing, said impeller having its inlet side adjacent said bearing and being secured to said shaft and bearing against said inner race, one branch of said passage communicating with the outlet side of said impeller and a second branch thereof communicating with said reservoir, the common end of said branched passage extending in proximity to said bearing, and means including a needle valve adjustable from the exterior of said housing for regulating the amount of air supplied from said impeller to said one branch of said passage.

THOMAS F. WORTH.